(12) United States Patent  
Fujiwara

(10) Patent No.: US 8,526,744 B2  
(45) Date of Patent: Sep. 3, 2013

(54) DOCUMENT PROCESSING APPARATUS AND COMPUTER READABLE MEDIUM

(75) Inventor: Kumi Fujiwara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 150 days.

(21) Appl. No.: 13/036,056

(22) Filed: Feb. 28, 2011

(65) Prior Publication Data

US 2012/0014612 A1    Jan. 19, 2012

(30) Foreign Application Priority Data

Jul. 16, 2010   (JP) ................................. 2010-161525

(51) Int. Cl.
*G06K 9/68*    (2006.01)

(52) U.S. Cl.
USPC ......................................................... 382/218

(58) Field of Classification Search
USPC ........................... 382/218, 278; 707/634, 803
See application file for complete search history.

(56) References Cited

U.S. PATENT DOCUMENTS 7,606,823 B2 * 10/2009 Kusakabe et al. ................... 1/1
8,229,250 B2 *  7/2012 Suzuki et al. ................. 382/294
2001/0044797 A1 * 11/2001 Anwar ........................... 707/102
2004/0013317 A1 *  1/2004 Eschbach et al. .............. 382/278
2005/0154703 A1 *  7/2005 Ikada ................................. 707/1
2005/0209951 A1 *  9/2005 Aron et al. ....................... 705/37
2009/0009782 A1 *  1/2009 Arakawa ........................ 358/1.9
2009/0030939 A1 *  1/2009 Terao ........................ 707/103 Y
2010/0036860 A1 *  2/2010 Hiura et al. .................... 707/101
2010/0115394 A1 *  5/2010 Oshima et al. ................. 715/234

FOREIGN PATENT DOCUMENTS

JP    2008-146104 A    6/2008
JP    2009-70107 A    4/2009

* cited by examiner

*Primary Examiner* — Vu Le
*Assistant Examiner* — Aklilu Woldemariam
(74) *Attorney, Agent, or Firm* — Sughrue Mion, PLLC

(57) ABSTRACT

A document processing apparatus includes a comparison source data acquisition unit that acquires a plurality of comparison source data each including a plurality of comparison source descriptions that are acquired from a comparison source document and ordered; a comparison target acquisition unit that acquires one or more comparison target data respectively acquired from comparison target documents; and a comparison result output unit that outputs a comparison result based on a minimum difference between one datum of the comparison source data and one data of the comparison target data corresponding to one of a plurality of combinations in each of which one of the comparison source data is combined with one of the comparison target data.

12 Claims, 13 Drawing Sheets

FIG. 6

| REGION | TOP-LEFT COORDINATE | LONGITUDINAL SIZE | LATERAL SIZE | CHARACTER STRING | FONT SIZE | DECORATION |
|---|---|---|---|---|---|---|
| a1 | (xa1, ya1) | ha1 | wa1 | AAAAA | 18 | NONE |
| a2 | (xa1, ya2) | ha2 | wa2 | AAAAA | 18 | NONE |
| a3 | (xa1, ya3) | ha3 | wa3 | BBBBB | 18 | NONE |
| a4 | (xa1, ya2) | ha4 | wa4 | 1) CCC | 18 | NONE |
| a5 | (xa1, ya5) | ha5 | wa5 | 2) DDD | 18 | NONE |
| a6 | (xa6, ya6) | ha6 | wa6 | EEE | 18 | NONE |
| a7 | (xa1, ya7) | ha7 | wa7 | 3) FFF | 18 | NONE |

FIG. 7

| REGION | TOP-LEFT COORDINATE | LONGITUDINAL SIZE | LATERAL SIZE | CHARACTER STRING | FONT SIZE | DECORATION |
|---|---|---|---|---|---|---|
| b1 | (xb1, yb1) | hb1 | wb1 | AAAAA | 18 | NONE |
| b2 | (xb1, yb2) | hb2 | wb2 | AAaAA | 18 | NONE |
| b3 | (xb1, yb3) | hb3 | wb3 | BBBBB | 18 | NONE |
| b4 | (xb1, yb4) | hb4 | wb4 | ZZZ | 18 | NONE |
| b5 | (xb1, yb5) | hb5 | wb5 | 1) | 18 | NONE |
| b6 | (xb1, yb6) | hb6 | wb6 | 2) | 18 | NONE |
| b7 | (xb7, yb5) | hb7 | wb7 | CCC | 18 | NONE |
| b8 | (xb8, yb6) | hb8 | wb8 | DDD | 18 | NONE |
| b9 | (xb1, yb9) | hb9 | wb9 | 3) FFF | 18 | NONE |

FIG. 14

| REFERENCE FACTORS | ga2 | gb2 | COMPARISON RESULT | FACTOR VALUE |
|---|---|---|---|---|
| CHARACTER STRING | 1) CCC2) DDD EEE | ZZZ1)2)CCC DDD | UNMATCHED | 8 |
| FONT SIZE | 18 | 18 | MATCHED | 0 |
| DECORATION: BOLDFACE | NONE | NONE | MATCHED | 0 |
| DECORATION: ITALIC-FACE | NONE | NONE | MATCHED | 0 |
| DECORATION: UNDERLINE | NONE | NONE | MATCHED | 0 |

FIG. 15

| REFERENCE FACTORS | ga2 | gb2 | COMPARISON RESULT | FACTOR VALUE |
|---|---|---|---|---|
| CHARACTER STRING | 1) CCC2) DDD EEE | ZZZ1)CCC 2)DDD | UNMATCHED | 6 |
| FONT SIZE | 18 | 18 | MATCHED | 0 |
| DECORATION: BOLDFACE | NONE | NONE | MATCHED | 0 |
| DECORATION: ITALIC-FACE | NONE | NONE | MATCHED | 0 |
| DECORATION: UNDERLINE | NONE | NONE | MATCHED | 0 |

US 8,526,744 B2

DOCUMENT PROCESSING APPARATUS AND COMPUTER READABLE MEDIUM

CROSS-REFERENCE TO RELATED APPLICATION

This application is based on and claims priority under 35 USC 119 from Japanese Patent Application No. 2010-161525 filed on Jul. 16, 2010.

BACKGROUND

Technical Field

The present invention relates to a document processing apparatus and computer readable medium.

SUMMARY

A document processing apparatus includes a comparison source data acquisition unit that acquires a plurality of comparison source data each including a plurality of comparison source descriptions that are acquired from a comparison source document and ordered; a comparison target acquisition unit that acquires one or more comparison target data respectively acquired from comparison target documents; and a comparison result output unit that outputs a comparison result based on a minimum difference between one datum of the comparison source data and one data of the comparison target data corresponding to one of a plurality of combinations in each of which one of the comparison source data is combined with one of the comparison target data.

BRIEF DESCRIPTION OF THE DRAWINGS

Exemplary embodiments of the invention will be described in detail based on the following figures, wherein:

FIG. 6 is a table illustrating an example of information concerning a description acquired from each region on the image illustrated in FIG. 4;

FIG. 7 is a table illustrating an example of information concerning a description acquired from each region on the image illustrated in FIG. 5;

FIG. 14 is a table illustrating the difference between comparison source data and comparison target data of a first combination of a second class;

FIG. 15 is a table illustrating the difference between comparison source data and comparison target data of a second combination of the second class.

DETAILED DESCRIPTION

Figure 1:
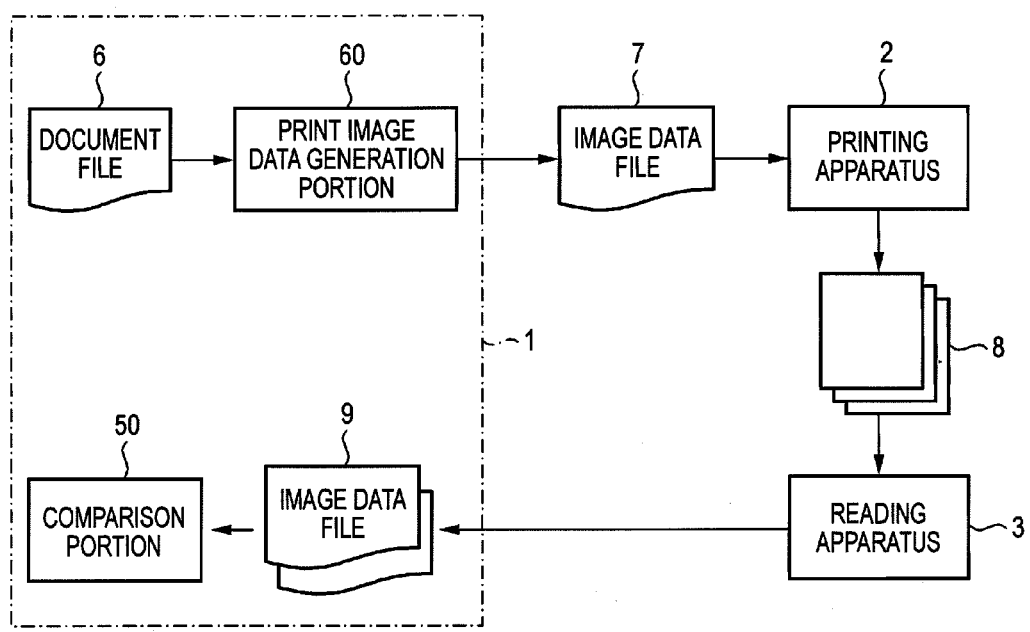
FIG. 1 is a diagram illustrating an example of the general outline of a document generation system according to an exemplary embodiment of the invention.

Hereinafter, an exemplary embodiment of the invention is described in detail with reference to the drawings. FIG. 1 is a diagram illustrating an example of the general outline of a document generation system according to an exemplary embodiment of the invention. The document generation system includes a document processing apparatus 1, a printing apparatus 2, and a reading apparatus 3.

The document processing apparatus 1 functionally includes a print image data generation portion 60 and a comparison portion 50. The print image data generation portion 60 generates information representing a print image from a document file 6, such as a text file, including character codes. In addition, the print image data generation portion 60 outputs the generated information as a print image data file 7. The printing apparatus 2 acquires the print image data file 7 and outputs, onto a recording medium 8 such as paper, an image represented by the print image data file 7. The reading apparatus 3 reads the image shown on the recording medium 8 and generates an image data file 9 containing information representing the image. The above sequence of processing is performed on each single document file. When the above sequence of processing is performed on two document files differing from each other, two read-image data files 9 are generated. The comparison portion 50 acquires the two image data files 9 and outputs a comparison result. However, information representing a document acquired by the comparison portion 50 cannot necessarily be information representing an image read from the recording medium 8 (the image data files 9). The information representing a document acquired by the comparison portion 50 can be, e.g., two pieces of information representing a print image (i.e., the image data files 7). Alternatively, one of the two image data files can be information representing a print image (i.e., the image data file 7), while the other image data file can be information representing a read-image (i.e., the image data file 9).

Figure 2:
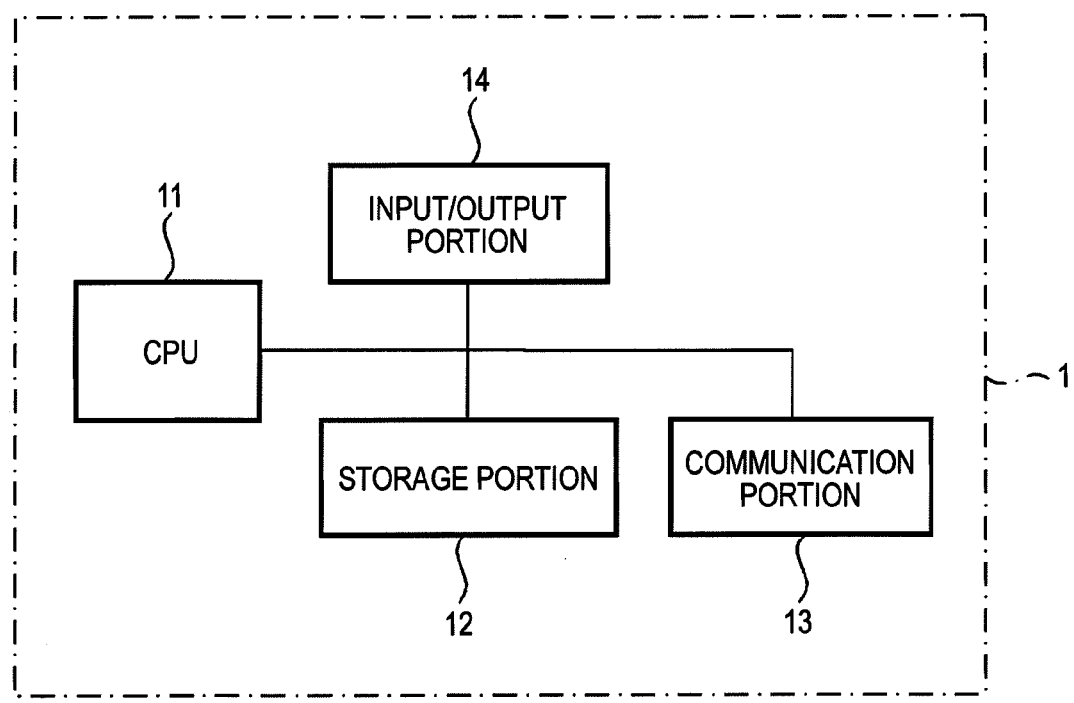
FIG. 2 is a diagram illustrating an example of the configuration of a document processing apparatus according to the exemplary embodiment of the invention.

FIG. 2 is a diagram illustrating an example of the configuration of a document processing apparatus 1 according to the exemplary embodiment of the invention. As illustrated in this figure, the document processing apparatus 1 includes a central processing unit (CPU) 11, a storage portion 12, a communication portion 13, and an input/output portion 14. The document processing apparatus 1 is configured by, e.g., a personal computer.

The CPU 11 operates according to a program stored in the storage portion 12. The above program can be provided by being stored in an information recording medium, e.g., a compact disc-read-only memory (CD-ROM) and a digital versatile disc-read-only memory (DVD-ROM). Alternatively, the above program can be provided via a network such as the Internet.

The storage portion 12 is configured by a memory device, such as a random access memory (RAM), a ROM, or hard disc drive (HDD). The storage portion 12 stores the above program. In addition, the storage portion 12 stores information input from each portion and calculation results.

The communication portion 13 is configured by communication means for being communication-connected to other apparatuses. The communication portion 13 transmits information to apparatuses, such as the printing apparatus 2, and inputs information received from the reading apparatus 3 and the like to the CPU 11 and the storage portion 12 under the control of the CPU 11.

The input/output portion 14 is configured by display output means such as a monitor, and input means such as a keyboard or a mouse. The input/output portion 14 outputs image data and the like to the monitor or the like, and acquires information input from the keyboard and the mouse by an operator under the control of the CPU 11. The printing apparatus 2 and the reading apparatus 3 can be connected to the input/output portion 14 via a printer cable and the like.

Figure 3:
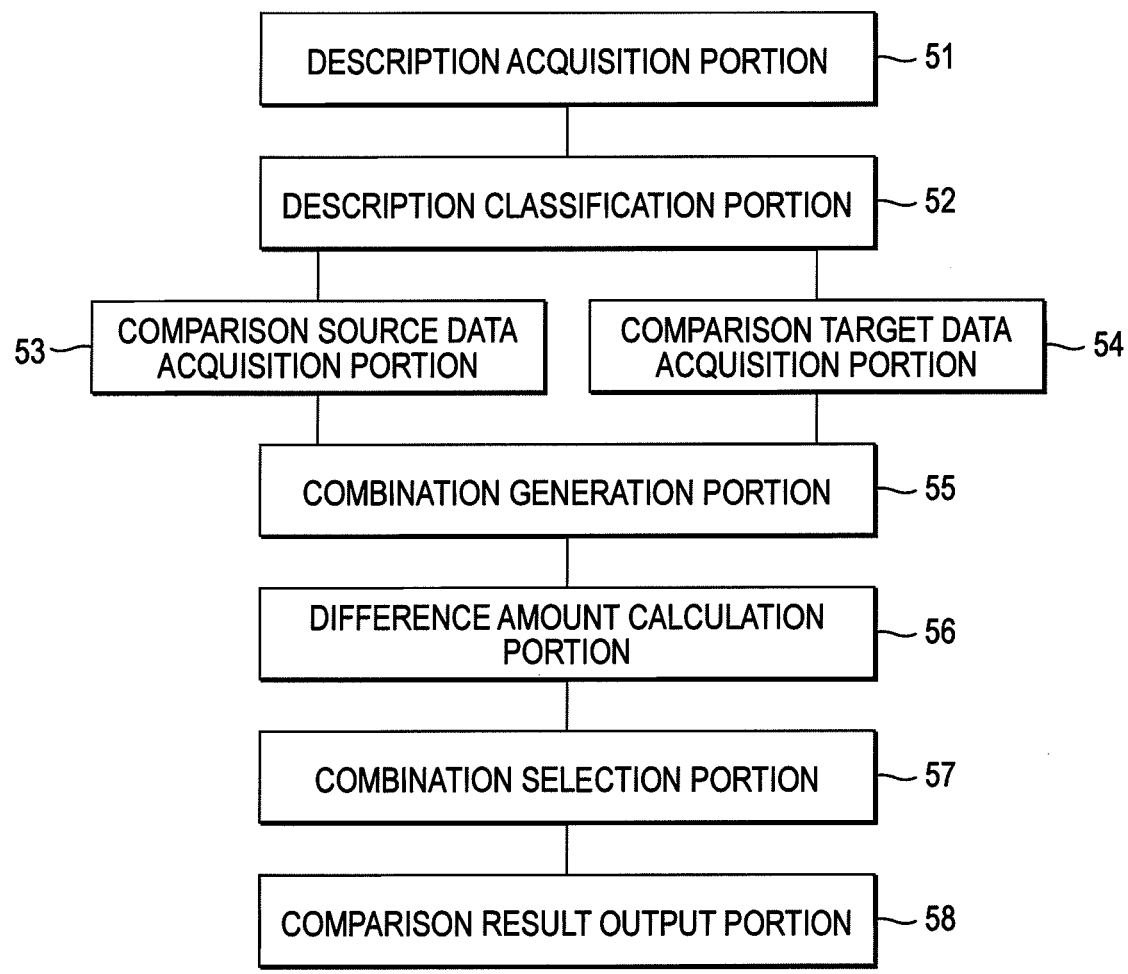
FIG. 3 is a functional block diagram illustrating functions implemented by the document processing apparatus according to the exemplary embodiment of the invention.

FIG. 3 is a functional block diagram illustrating functions implemented by the document processing apparatus 1 according to the exemplary embodiment of the invention. This figure illustrates particularly the functions included by the comparison portion 50 of the document processing apparatus 1. The document processing apparatus 1 includes a description acquisition portion 51, a description classification portion 52, a comparison source data acquisition portion 53, a comparison target data acquisition portion 54, a combination generation portion 55, a difference calculation portion 56, a combination selection portion 57, and a comparison result output portion 58. The functions are implemented by executing the programs stored in the storage portion 12 and controlling the communication portion 13 and the input/output portion 14 by the CPU 11.

The description acquisition portion 51 is implemented mainly by the CPU 11, the storage portion 12, and the communication portion 13. The description acquisition portion 51 acquires plural of descriptions (hereinafter referred to as comparison target descriptions) from a document serving as a comparison source. More specifically, the description acquisition portion 51 acquires from the reading apparatus 3 a document serving as a comparison target, and a document serving as a comparison source, and also acquires plural of descriptions (hereinafter referred to as comparison target descriptions) from the document serving as the comparison target. The description acquisition portion 51 causes the storage portion 12 to store the acquired comparison target descriptions and the acquired comparison source descriptions.

Figure 4:
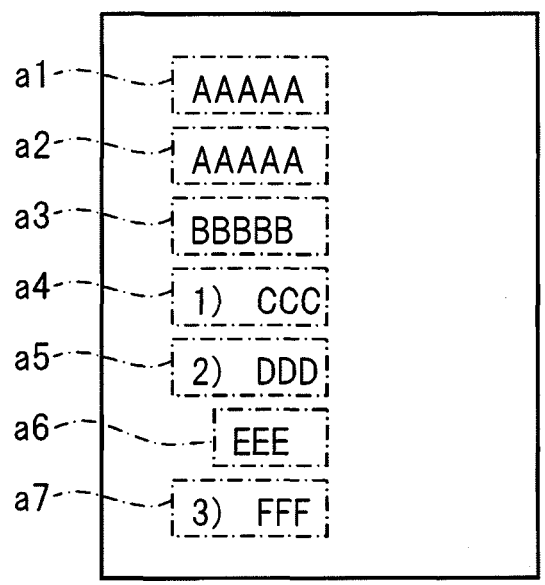
FIG. 4 is a diagram illustrating an example of an image of a document serving as a comparison target.
Figure 5:
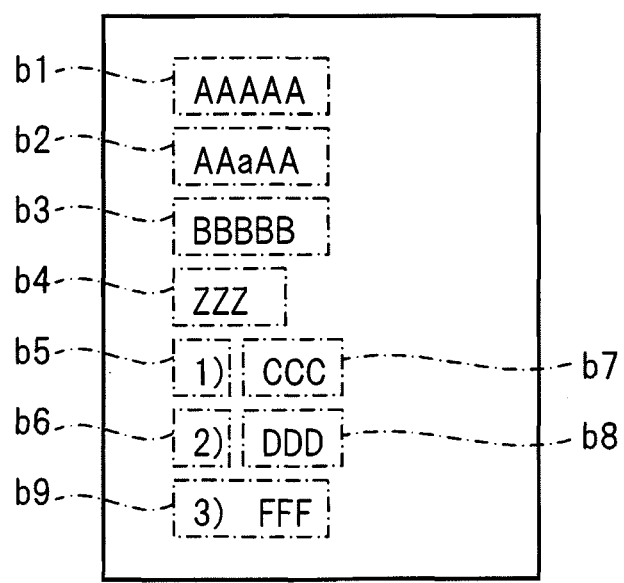
FIG. 5 is a diagram illustrating an example of an image of a document serving as a comparison source.

Hereinafter, an operation of the description acquisition portion 51 is described with reference to more specific examples. FIG. 4 is a diagram illustrating an example of an image of a document serving as a comparison target. FIG. 5 is a diagram illustrating an example of an image of a document serving as a comparison source. The description acquisition portion 51 partitions each of the image of the document serving as the comparison source, and the image of the document serving as the comparison target into plural of regions separated from one another. It is advisable to use known layout analysis techniques included in OCR processing or the like as a method of partitioning an image into regions provided thereon. In the case of an example illustrated in FIG. 4, the image serving as the comparison target is partitioned into seven rectangular regions a1 to a7. In the example illustrated in FIG. 5, the image serving as the comparison source is partitioned into nine rectangular regions b1 to b9. Sometimes, a character string recognized as one region in the image of one of the documents respectively serving as the comparison target and the comparison source is recognized as that extending over plural of regions in the image of the other document due to the difference between the character strings and a reading or printing error. In the case of the examples illustrated in FIGS. 4 and 5, e.g., the region a4 of the image of the comparison target and each of the regions b5 and b7 of the image of the comparison source are established in such relationship. According to the present exemplary embodiment, if a character string extends over plural of lines, the character-string' parts respectively arranged on different lines are classified as different regions.

The description acquisition portion 51 acquires information concerning the acquired-description, such as the position and the size of the region in which the description is acquired, the character string of the acquired-description, and the attributes (e.g., a font size and decorations) of the character of the acquired-description. FIG. 6 is a table illustrating an example of information concerning a description acquired from each region on the image illustrated in FIG. 4. FIG. 7 is a table illustrating an example of information concerning a description acquired from each region on the image illustrated in FIG. 5. In the case of the examples illustrated in FIGS. 6 and 7, the description acquisition portion 51 acquires a region identifier, the top-left coordinate of a rectangular region, and the longitudinal size and the lateral size of each region as information concerning each description. In addition, the description acquisition portion 51 also acquires character decoration information such as a boldface, an italic-face, and an underline, and a font size as information concerning each description.

Figure 8:
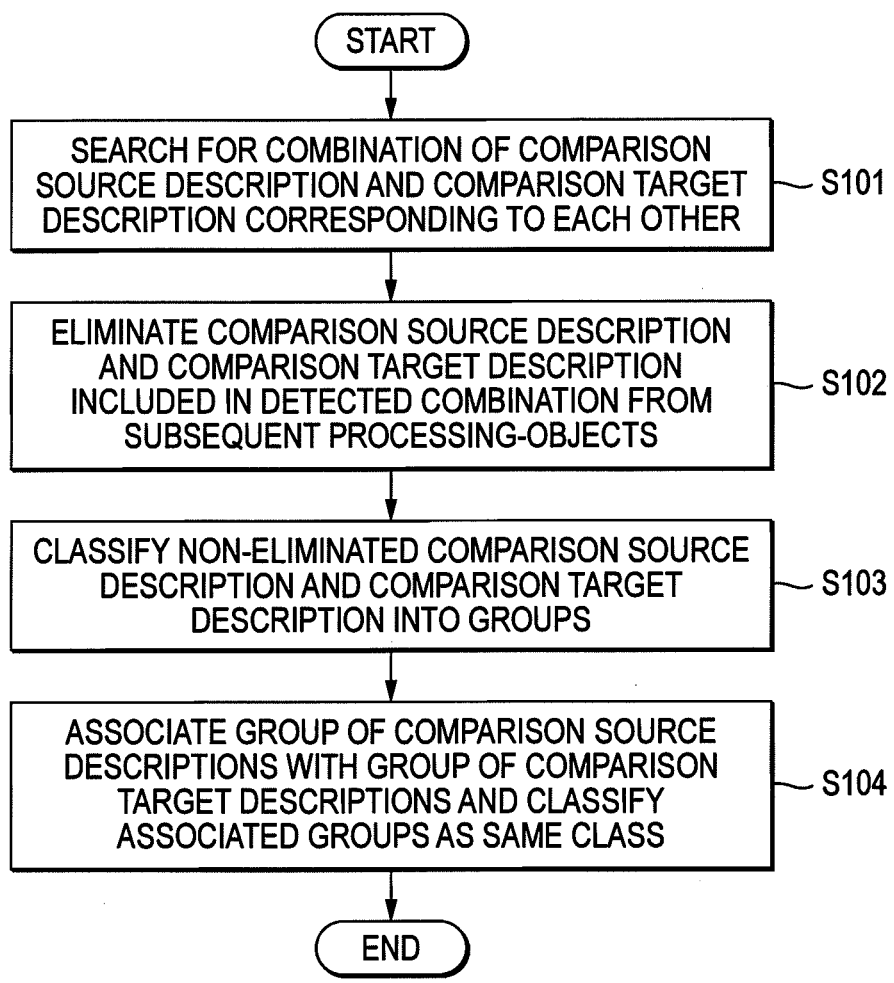
FIG. 8 is a flowchart illustrating a process flow performed by a description classification portion.

The description classification portion 52 is implemented mainly by the CPU 11 and the storage portion 12. The description classification portion 52 classifies plural of comparison source descriptions and plural of comparison target descriptions according to a common partition-principle based thereon. FIG. 8 is a flowchart illustrating a process flow performed by the description classification portion 52. First, in step S101, the description classification portion 52 searches for the combination of the comparison source description and the comparison target description which correspond to each other. More specifically, the description classification portion 52 detects the comparison source description and the comparison target description which are matched with each other in a character string and in the description factors, e.g., the attributes of characters, as the comparison source description and the comparison target description which correspond to each other. Hereinafter, a certain case is described, in which the description classification portion 52 detects the comparison source description and the comparison target description which are matched with each other in the character string. In the examples illustrated in FIGS. 6 and 7, the description classification portion 52 detects the combination between the descriptions respectively corresponding to the regions a1 and b1, the combination between the descriptions respectively corresponding to the regions a3 and b3, and the combination between the descriptions respectively corresponding to the regions a7 and b9. The description classification portion 52 can be configured to detect only the combination between the comparison source description and the comparison target description, the number of characters of the character string of one of which is equal to or more than a predetermined number of characters. In this case, the probability of erroneously detecting the combination of the comparison source description and the comparison target description, which appear to a user not to correspond to each other and are accidentally matched with each other in a character string, is reduced.

Figure 9:
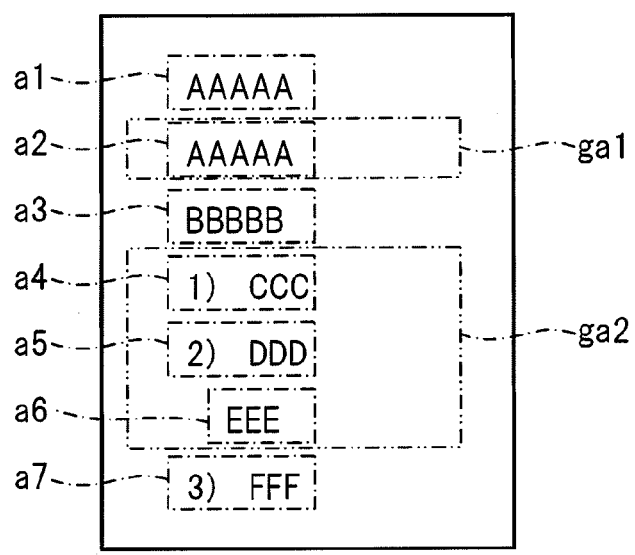
FIG. 9 is a diagram illustrating an example of groups of comparison target descriptions.

Next, in step S102, the description classification portion 52 eliminates the comparison source descriptions and the comparison target descriptions included in the detected combination from the processing-objects to be processed subsequently. In addition, the comparison source descriptions and the comparison target descriptions included in the detected combinations are eliminated from processing-objects to be processed by each of the comparison source data acquisition portion 53 and the comparison target data acquisition portion 54. In step S103, the description classification portion 52 classifies a set of the comparison source descriptions and a set of the comparison target descriptions, which are not eliminated, into groups respectively corresponding to the sets. For example, the description classification portion 52 sets a comparison source description located between two of plural of comparison source descriptions detected in step S101 as one group. Similarly, the description classification portion 52 sets a comparison target description located between two of plural of comparison target descriptions detected in step S101 as one group. FIG. 9 is a diagram illustrating an example of a group of the comparison target descriptions. Regarding regions a1, a3, and a7, which are the regions of the comparison target descriptions detected in step S101, the description corresponding to the region a2 located between the regions a1 and a3 "adjoining" each other among the regions having a corresponding comparison source description is classified as a first group ga1 of the comparison target description. Similarly, the descriptions corresponding to the regions a4, a5, and a6 located between the regions a3 and a7 are classified as a second group ga2 of the comparison target description. In the case of a horizontally-written document, it is determined according to the value of the y-coordinate (set to increase downwardly, as viewed in FIG. 9) of the top-left position of a region, from which a comparison source description is acquired, whether the comparison source description is located between comparison source descriptions having a corresponding comparison target description. In the case illustrated in FIG. 9, the descriptions corresponding to the regions a4, a5, and a6, the y-coordinate of the top-left position of each of which has a value larger than the value ya3 of the y-coordinate of the region a3 and smaller than the value ya7 of the y-coordinate of the region a7, are recognized as a group ga2. In the case of a vertically-written document, a double-column setting document or the like, the classification of the comparison target descriptions can be performed, also using the value of the x-coordinate of the region. The comparison source descriptions can be classified into groups by a similar method.

Then, in step S104, the description classification portion 52 associates the groups of the comparison source descriptions with the groups of the comparison target descriptions and classifies the descriptions belonging to the associated groups as the same class. More specifically, a certain group of comparison source descriptions located between the two "adjoining" comparison source descriptions detected in step S101 is associated with a group of plural of comparison source descriptions located between two comparison target descriptions respectively corresponding to the two comparison source descriptions. The associated groups are classified as the same class. In the example according to the present exemplary embodiment, the associated group of the comparison source descriptions and the associated group of the comparison target descriptions are classified as the same class by giving the same ordinal number to each of these associated groups. In the example illustrated in FIGS. 4 and 5, the group ga1 of the comparison target descriptions corresponding to the region a2 is associated with the group gb1 of the comparison source descriptions corresponding to the region b2. The descriptions of the group ga1 and the group gb1 are classified as a first group. Then, the group ga2 of the comparison target descriptions corresponding to the regions a4 to a6 is associated with the group gb2 of the comparison source descriptions corresponding to the regions b4 to b8. The descriptions of the group ga2 and the group gb2 are classified as a second class.

Figure 10:
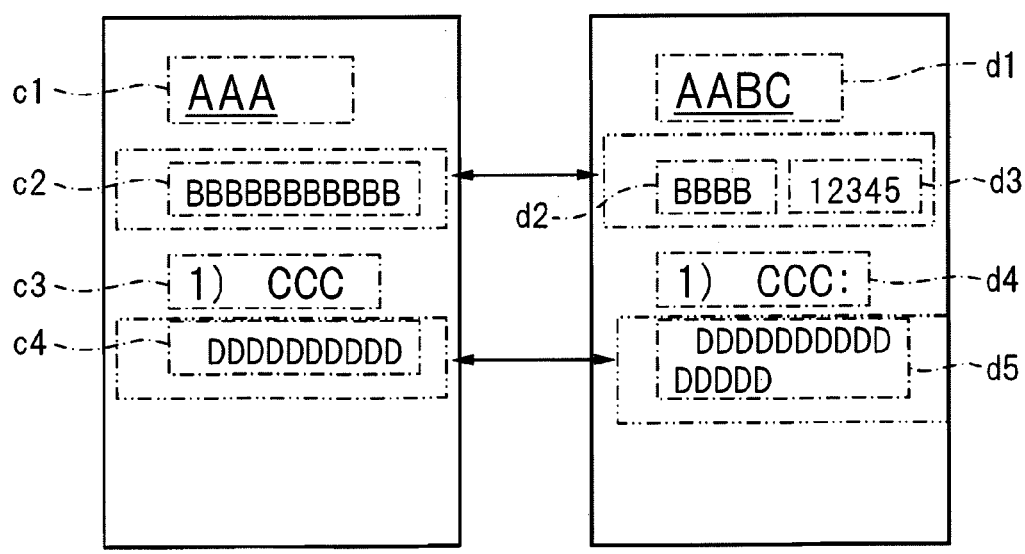
FIG. 10 is a diagram illustrating groups of comparison source descriptions and comparison target descriptions classified according to the attribute of characters.

The description classification portion 52 can detect, in step S101, the combination of the comparison source description and the comparison target description which have the same character attribute. In a case where the size of fonts and the decoration such as an underline used for the title of the document itself and the heading of the chapter are made to differ from those used in other descriptions, and where a common decoration is used in common in a comparison source document and a comparison target document, the comparison source description and the comparison target description which correspond to each other can be acquired according to the decoration. FIG. 10 is a diagram illustrating an example of groups of comparison source descriptions and comparison target descriptions classified according to the attribute of characters. An image of a comparison target document is illustrated in a left-side part of FIG. 10. An image of a comparison source document is illustrated in a right-side part of FIG. 10. In this figure, the character string "AAA" of the comparison target description corresponding to the region c1 differs from that "AABC" of the comparison source description corresponding to the region d1. However, these character strings are equal to each other in font size and are subjected to the same decoration (i.e., an underlining operation). Accordingly, these character strings are detected as the comparison target description and the comparison source description which correspond to each other. Consequently, the comparison target description corresponding to a region c2 located between regions c1 and c3, and the comparison source descriptions respectively corresponding to regions d2 and d3 located between regions d1 and d4 are classified as the descriptions of the same class. In this case, the comparison target description and the comparison source description which correspond to each other can be used as a processing-object to be processed in step S103 or later.

The comparison source data acquisition portion 53 is implemented mainly by the CPU 11 and the storage portion 12. The comparison source data acquisition portion 53 generates and acquires, at each of the classes, plural of comparison source data that is data obtained by performing the ordering of plural of comparison source descriptions. Focusing attention on a certain group, the comparison source data acquisition portion 53 generates and acquires plural of comparison source data by performing the ordering of at least a part of plural of comparison source descriptions. The comparison target data acquisition portion 54 is implemented mainly by the CPU 11 and the storage portion 12. The comparison target data acquisition portion 54 generates and acquires, at each of the classes, plural of comparison target data that is data obtained by performing the ordering of plural of comparison target descriptions. Focusing attention on a certain group, the comparison target data acquisition portion 54 generates and acquires plural of comparison target data by performing the ordering of at least a part of plural of comparison target descriptions. The difference between the comparison source data acquisition portion 53 and the comparison target data acquisition portion 54 in the processing to be performed resides in that an input to the comparison source data acquisition portion 53 is a group of comparison source descriptions and an output thereof is comparison source data, and that an input to the comparison target data acquisition portion 54 is a group of comparison target descriptions and an output thereof is comparison target data.

Figure 11:
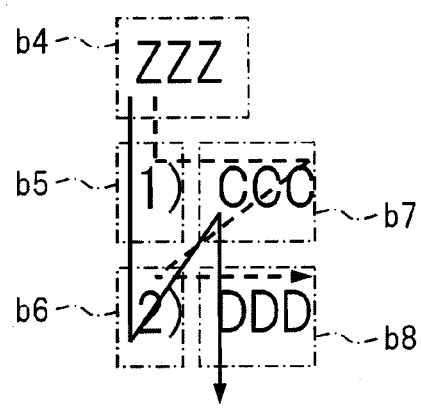
FIG. 11 is a diagram illustrating an example of performing the ordering of comparison source data.

The comparison source data acquisition portion 53 performs the ordering of the comparison source descriptions, based on the arrangement of the regions from which the comparison source descriptions are obtained, and generates plural of comparison source data. Similarly, the comparison target data acquisition portion 54 performs the ordering of the comparison target descriptions, based on the arrangement of the regions from which the comparison target descriptions are obtained, and generates one or more of comparison target data. To perform ordering based on the arrangement of the regions, the coordinate of the top-left of each region, from which each comparison source description or each comparison target description is acquired, and so on. For example, when a comparison source datum is generated, the comparison source data acquisition portion 53 determines the order of each comparison source description by arranging comparison source descriptions in an ascending order of the value of the x-coordinate of each region from which each comparison source description is obtained. In addition, the comparison source data acquisition portion 53 determines the order of comparison source descriptions acquired from the regions having the same x-coordinate, by arranging such comparison source descriptions in an ascending order of the value of the y-coordinate of each of such regions. When another comparison source datum is generated, the comparison source data acquisition portion 53 determines the order of each comparison source description in an ascending order of the value of the y-coordinate of the region from which each comparison source description is obtained. In addition, the comparison source data acquisition portion 53 determines the order of comparison source descriptions acquired from the regions having the same y-coordinate, by arranging such comparison source descriptions in an ascending order of the value of the x-coordinate of each of such regions. When a comparison target datum is generated, the comparison target data acquisition portion 54 determines the order of comparison target descriptions similarly. Hereinafter, the case of performing this process in the example illustrated in FIGS. 4 to 7 is described. FIG. 11 is a diagram illustrating an example of performing the ordering of comparison source data. Assuming that regions b4, b5, and b6 are equal to one another in the x-coordinate, and that regions b7 and b8 are equal to each other in the x-coordinate, when the ordering is performed by the former method, the comparison source descriptions of the second group gb2 are arranged in the following order of the associated regions, i.e., b4, b5, b6, b7, and b8 (as indicated by a solid arrow in FIG. 11). When the ordering is performed by the latter method, the comparison source descriptions of the second group gb2 are arranged in the following order of the associated regions, i.e., b4, b5, b7, b6, and b8 (as indicated by a dashed arrow in FIG. 11). The number of the comparison source data of the second class is 2. Incidentally, a region identifier is described as a description identifier. On the other hand, in both the case of performing the former method and the case of performing the latter method, the comparison target descriptions of the second group ga1 is arranged in the same order of the associated regions, i.e., a4, a5, and a6. Accordingly, the number of the comparison target data of the obtained second class is 1.

Figure 12:
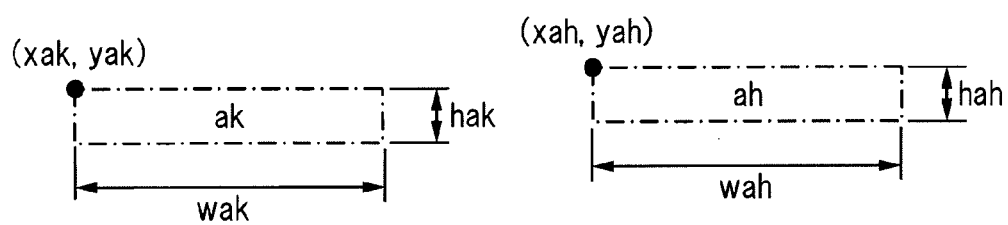
FIG. 12 is a diagram illustrating an example of a method of performing the ordering of comparison source descriptions or comparison target descriptions.

When the ordering is performed to generate comparison source data or comparison target data, the size of each region can be taken into consideration. According to this method, when a comparison source datum is generated, some line candidate sets are sequentially generated from a region having a small y-coordinate by arranging the regions in an ascending order of the y-coordinate of the region. The descriptions are arranged from that belonging to the line candidate set having a small number. In addition, among the descriptions of the same line candidate set, the descriptions are arranged in the ascending order of the x-coordinate. When another comparison source datum is generated, some column candidate sets are serially generated from a region having a small x-coordinate by arranging the regions in an ascending order of the x-coordinate of the region. The descriptions are arranged from that belonging to the column candidate set having a low number. In addition, among the descriptions of the same column candidate set, the descriptions are arranged in the ascending order of the y-coordinate. FIG. 12 is a diagram illustrating an example of a method of performing ordering on comparison source descriptions or comparison target descriptions. For example, regions ak and ah satisfying the following conditions are set as line candidate sets.

$$xak+wak \leq xah$$

$$|yak-yah| \leq \max(hak,hah)$$

Thus, among plural of regions of descriptions, two descriptions are treated as the same line candidate, if the projections in the y-direction of the regions overlap each other even when the y-coordinates of the regions respectively corresponding to the two descriptions are shifted from each other. When information concerning the arrangement of the descriptions is used like the present exemplary embodiment, the number of the comparison source data to be generated is reduced. An amount of the subsequent calculation is also reduced. When using the information concerning the arrangement, the comparison source data or the comparison target data, which act against a principle that regions located closer to each other are more likely to be continuous, are eliminated. The comparison source data acquisition portion 53 and the comparison target data acquisition portion 54 can be configured to generate comparison source data and comparison target data, respectively, using all the permutations of the descriptions without using the information concerning the arrangement.

Not both of the comparison source data and the comparison target data can be generated by performing the ordering. For example, between the images of the two documents, only the image of the comparison source data or the comparison target data, which is larger than the other of the comparison source data and the comparison target data in the number of recognized regions (and can be determined as comparison source data), can be generated by performing the ordering. At that time, the comparison source data or the comparison target data, which is smaller than the other of the comparison source data and the comparison target data in the number of recognized regions (and can be determined as comparison target data), can be generated by utilizing the order at which the description acquisition portion 51 acquires information concerning the description, as it is. As described above in the foregoing description of the description classification portion 52, among plural of comparison source descriptions, one or more comparison source descriptions each having an associated comparison target description are eliminated from the ordering-objects.

According to the present exemplary embodiment, as described above, if a character string extends over plural of lines, parts of the character string, which are arranged on different lines, are classified as different regions. Thus, e.g., the regions b5 and b6 illustrated in FIG. 5 can be prevented from being recognized as one region. The arrangement of the character strings of plural of descriptions corresponding to at least one of the comparison source data is set to be the same as the arrangement of character strings of the descriptions corresponding to the comparison target data.

Figure 13:
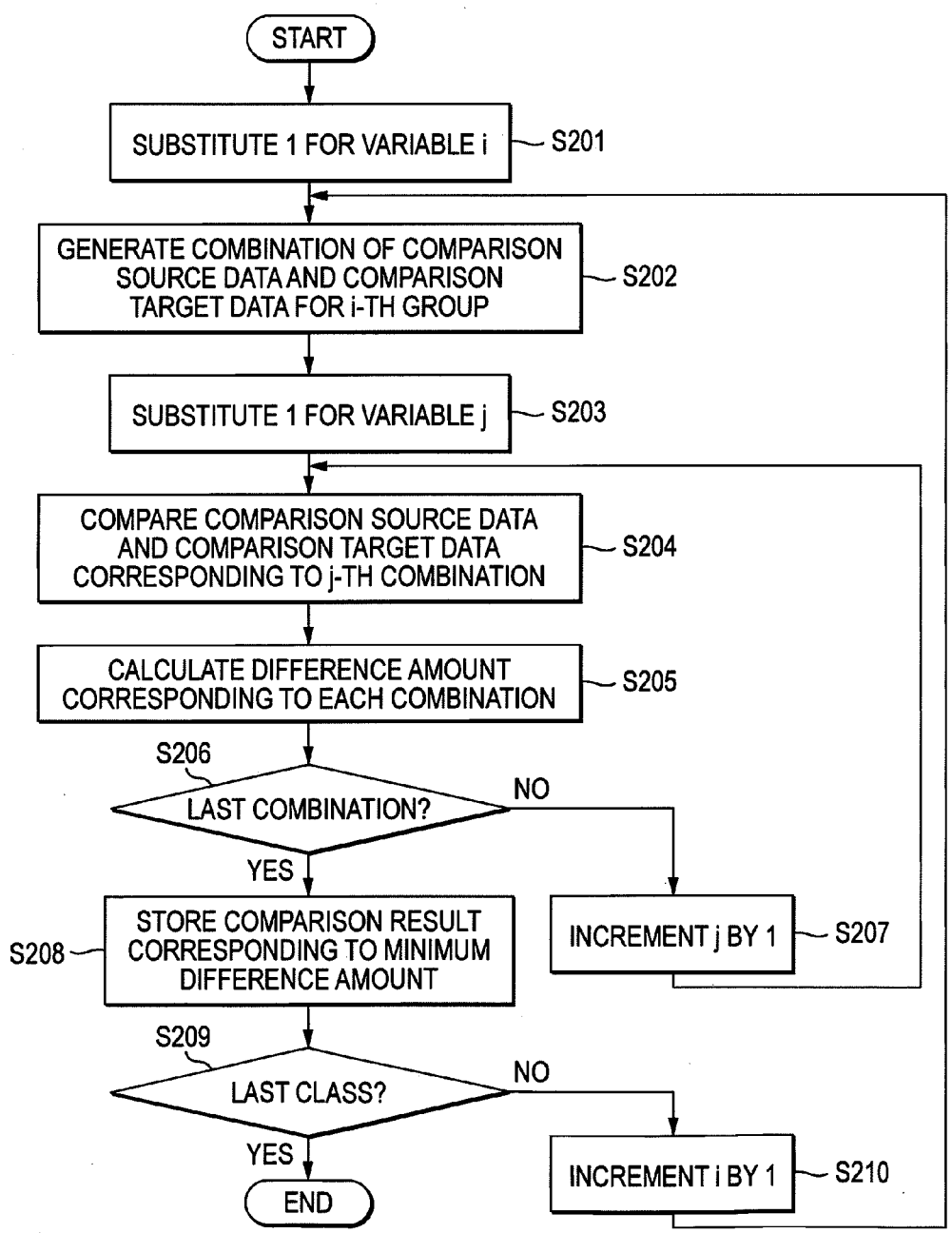
FIG. 13 is a flowchart illustrating a process flow performed by a combination generation portion, a difference amount calculation portion, and a combination selection portion.

FIG. 13 is a flowchart illustrating a process flow performed by the combination generation portion 55, the difference amount calculation portion 56, and the combination selection portion 57. The combination generation portion 55 is implemented mainly by the CPU 11 and the storage portion 12. The combination generation portion 55 generates plural of combinations each of which is configured by one of the comparison source data and one of the comparison target data, corresponding to each class. More specifically, first, in step S201, the combination generation portion 55 substitutes 1 for a variable i. Next, in step S202, the combination generation portion 55 generates all combinations of comparison source data and comparison target data, corresponding to an i-th class. The number of the combinations is given by (the number of comparison source data)×(the number of comparison target data). In the example illustrated in FIGS. 4 to 7, in the case of the second class, the number of the comparison source data is 2. The number of the comparison target data is 1. Thus, the number of the combinations is 2.

The difference amount calculation portion 56 is implemented mainly by the CPU 11 and the storage portion 12. The difference amount calculation portion 56 calculates an amount of the difference between the comparison source data and the comparison target data corresponding to each of the combinations. First, in step S203, the difference amount calculation portion 56 substitutes 1 for a variable j. Next, in step S204, the difference amount calculation portion 56 compares the comparison source data with the comparison target data corresponding to a j-th combination. The comparison is made on the comparison source data and the comparison target data of the combination in the character strings, the font size, the presence/absence of the decoration boldface, the presence/absence of the decoration italic-face, and the presence/absence of the decoration underline. The character strings in the comparison source data and the comparison target data are those of the descriptions, which are arranged in the order determined by the ordering. FIG. 14 is a table illustrating the difference between the comparison source data and the comparison target data of the first combination of the second group. In the case illustrated in this figure, it is detected, as a result of the comparison, that the character strings are unmatched. Next, in step S205, the difference amount calculation portion 56 calculates the amount of the difference therebetween corresponding to each combination. For example, the difference amount calculation portion 56 obtains, as a factor value, the magnitude of the difference therebetween in each of the factors, such as the character string, the font size, and the decoration boldface. Then, the difference amount calculation portion 56 performs the weighting of the factor values, and calculates the combination of the weighted factor values, and sets a resultant value as the amount of the difference corresponding to the combination. Regarding the character string factor, the editing cost required to perform the editing of one of the character strings to change the one of the character strings to the other character string is set as the factor value of the difference amount. More specifically, the cost per character in the case of performing the insertion, the deletion, and the movement of the character string is assumed to be "1". In addition, the cost per character in the case of performing the substitution of the character string is assumed to be "2". In the case of the example illustrated in FIG. 14, the number of characters inserted thereinto is 3. The number of characters deleted therefrom is 3. The number of characters moved therein is 2. Thus, the edition cost is 8. Regarding the decoration, the factor value can be set when the decoration is matched. Alternatively, the number of matched characters can be set as the factor value. If the weight of each factor is assumed to be 1, the difference amount of the combination illustrated in FIG. 14 is 8. FIG. 15 is a table illustrating the difference between comparison source data and comparison target data of the second combination of the second group. The difference amount of the combination illustrated in FIG. 15 is 6.

Next, if the combination whose difference amount is calculated is not the last combination in this class (N in step S206), in step S207, the difference amount calculation portion 56 increments the variable j by 1. Then, the processing in step S204 or later is repeated. If the combination whose difference amount is calculated is the last combination in this class (Y in step S206), the process proceeds to step S208.

The combination selection portion 57 is implemented mainly by the CPU 11 and the storage portion 12. In step S208, the combination selection portion 57 selects, from plural of combinations, the combination of the comparison source data and the comparison target data, the difference amount between which is minimal, and causes the storage portion 12 to store the selected combination. In the case of the example illustrated in FIGS. 14 and 15, the difference amount between the comparison source data the comparison target data of the second combination of the second class is minimal. Thus, the second combination is selected. In addition, a result of the comparison is stored in the storage portion 12. If the group currently processed is not the last class (N in step S209), in step S210, the combination selection portion 57 increments the variable i by 1. Then, the processing in step S202 or later is repeated. If the group currently processed is the last class, the processing performed by the combination generation portion 55, the difference amount calculation portion 56, and the combination selection portion 57 is finished.

Figure 16:
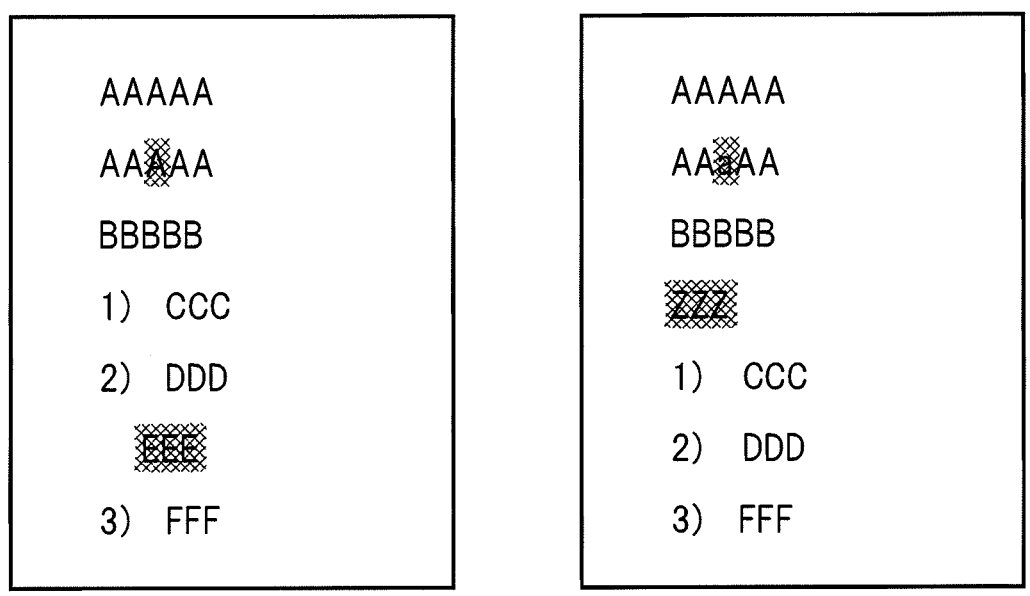
FIG. 16 is a diagram illustrating an example of images into which a comparison result is output.

The comparison result output portion 58 is implemented mainly by the CPU 11, the storage portion 12, and the input/output portion 14. The comparison result output portion 58 outputs a result of the comparison, based on the comparison source data and the comparison target data corresponding to the combination of each class, which is selected by the combination selection portion 57. FIG. 16 is a diagram illustrating an example of images into which a comparison result is output. A comparison target document is illustrated in a left-side part of FIG. 16. A comparison source document is illustrated in a right-side part thereof. In the example illustrated in FIG. 16, each unmatched character is output by changing the background of the unmatched character. However, the unmatched character can be output by changing the color of the unmatched character. Alternatively, the color of the background of the description included in the group of comparison source data, in which an unmatched character is included, can be changed. Alternatively, a result of the comparison can be output by displaying only one of the comparison target document and the comparison source document and only a different part therebetween so that the character corresponding to the different part can be recognized. Alternatively, neither the comparison source document nor the comparison target document is displayed. In addition, the character string at the different part, and information representing the position of the different part can be output.

Figure 17:
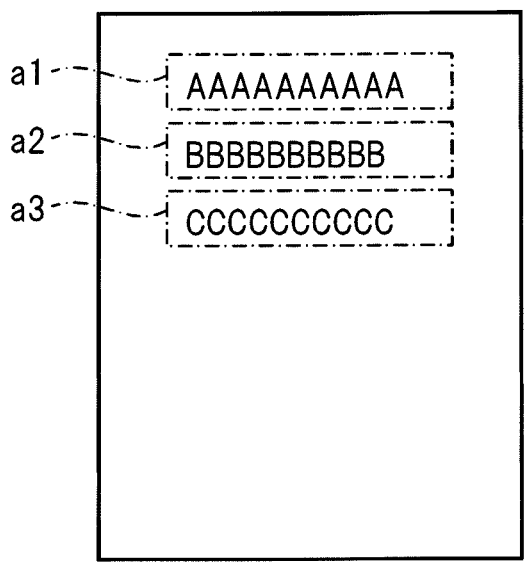
FIG. 17 is a diagram illustrating another example of an image of a document serving as a comparison target.
Figure 18:
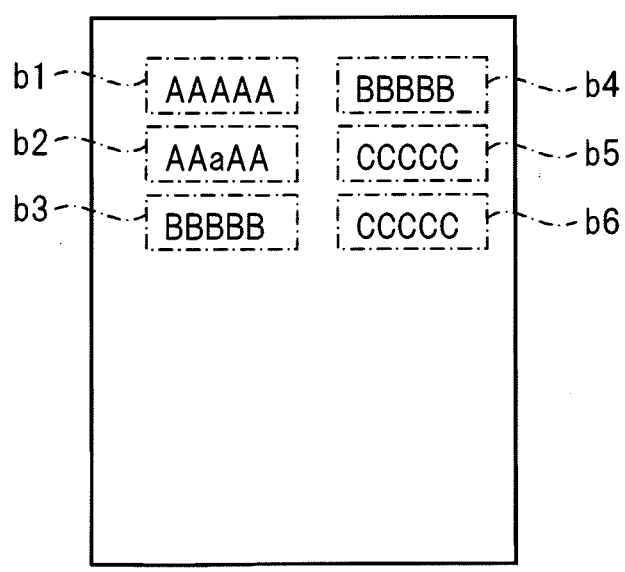
FIG. 18 is a diagram illustrating another example of an image of a document serving as a comparison source.

In the document processing apparatus 1 according to the present exemplary embodiment, a comparison result is output even when the layouts of the two documents to be compared differ from each other, because one of the two documents is a double-column setting one and the other document is a single-column setting document. FIG. 17 is a diagram illustrating another example of the image of the document serving as a comparison target. FIG. 18 is a diagram illustrating another example of the image of the document serving as a comparison source. If a character string extends over plural of lines, the description acquisition portion 51 classifies parts of the character string, which are arranged on different lines, as different regions. Then, the comparison target descriptions respectively corresponding to the regions a1, a2, and a3 are acquired from the single-column setting comparison target document, while the comparison source descriptions respectively corresponding to the regions b1, b2, b3, b4, b5, and b6 are acquired from the double-column setting comparison source document. Thus, the comparison target data acquisition portion 54 generates comparison target data including descriptions arranged respectively corresponding to the regions a1, a2, and a3 in this order. The comparison source data acquisition portion 53 generates comparison source data including at least the descriptions arranged respectively corresponding to the regions b1, b2, b3, b4, b5, and b6 in this order. Then, the difference amount calculation portion 56 makes comparison on the combination between the above comparison source data and the above comparison target data. Because it is apparent that this combination is smaller than other combinations in the difference amount, the comparison result output portion 58 outputs the difference corresponding to this combination as a comparison result.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A document processing apparatus, comprising:
    a comparison source data acquisition unit that acquires a plurality of comparison source data, each of the plurality of the comparison source data including a plurality of comparison source descriptions that are acquired from a comparison source document and ordered;
    a comparison target data acquisition unit that acquires one or more comparison target data respectively acquired from comparison target documents; and
    a comparison result output unit that outputs a comparison result based on a minimum difference between one of the plurality of the comparison source data and one of the one or more comparison target data corresponding to one of a plurality of combinations in which the one of the plurality of the comparison source data is combined with the one of the one or more comparison target data.

2. The document processing apparatus according to claim 1, wherein the plurality of comparison source descriptions are acquired from different regions of the comparison source document.

3. The document processing apparatus according to claim 2, wherein the comparison source data acquisition unit generates the plurality of comparison source data in each of which the plurality of comparison source descriptions are ordered based on arrangement of the different regions from which the plurality of comparison source descriptions are acquired.

4. The document processing apparatus according to claim 1, wherein the comparison target data acquisition unit generates the one or more comparison target data, each of the one or more comparison target data including a plurality of comparison target descriptions that are acquired from the comparison target documents and ordered.

5. The document processing apparatus according to claim 4, further comprising:
    a description classification unit that classifies the plurality of comparison source descriptions and the plurality of comparison target descriptions into common classes, based on the plurality of comparison source descriptions and the plurality of comparison target descriptions, wherein
    the comparison source data acquisition unit generates the plurality of comparison source data, in each of which the comparison source descriptions are ordered, corresponding to each of the classes;
    the comparison target data acquisition unit generates the one or more comparison target data, in each of which the comparison target descriptions are ordered, corresponding to each of the classes; and
    the comparison result output unit selects, for each of the classes, a combination between the one of the plurality of the comparison source data and the one of the one or more comparison target data, the difference amount between which is minimal, from among the plurality of combinations in which the one of the plurality of the comparison source data is combined with the one of the one or more comparison target data, and outputs the comparison result based on the difference amount of the selected combination for each of the classes.

6. The document processing apparatus according to claim 5, wherein the description classification unit classifies a group of comparison source descriptions located between two comparison source descriptions each of which has an associated comparison target description, among the plurality of comparison source data, and a group of comparison target descriptions located between two of the comparison target descriptions, which respectively correspond to the two comparison source descriptions, as a common class.

7. The document processing apparatus according to claim 4, wherein the comparison source data generation unit generates the comparison source data in which comparison source descriptions other than one or more comparison source descriptions respectively corresponding to comparison target descriptions are ordered among the plurality of comparison target descriptions; and
    the comparison target data generation unit generates the comparison target data in which comparison target descriptions other than comparison target descriptions respectively corresponding to the one or more comparison source descriptions each having an associated comparison target description are ordered.

8. A non-transitory computer readable medium storing a computer readable program executable by a computer for causing a computer to execute a processing document, the process comprising:
 acquiring a plurality of comparison source data each of the plurality of the comparison source data including a plurality of comparison source descriptions that are acquired from a comparison source document and ordered;
 acquiring one or more comparison target data respectively acquired from comparison target documents; and
 outputting a comparison result based on a minimum difference between one of the plurality of the comparison source data and one of the one or more comparison target data corresponding to of one of a plurality of combinations in which the one of the plurality of the comparison source data is combined with one of the one or more comparison target data.

9. The document processing apparatus according to claim 1, wherein a plurality of regions of the comparison source document respectively correspond to the plurality of the comparison source data, and the plurality of the comparison source descriptions comprise region description information of a region, from among the plurality of the regions, corresponding to the respective comparison source data, the region description information comprising a region identifier of the region.

10. The document processing apparatus of claim 9, wherein the region description information further comprises location information and size information of the region, associated with the region identifier.

11. The document processing apparatus of claim 10, wherein the region description information further comprises content information indicating content included in the region and attribute information of the content associated with the region identifier, the attribute information comprising content size information and content style information.

12. The document processing apparatus of claim 11, wherein the content size information comprises font size of the content and the content style information comprises one or more of boldface information, italic-face information, and underline information of the content.

* * * * *